Jan. 17, 1950     E. F. STOVER     2,494,781
FLUID METER
Filed Sept. 29, 1944            2 Sheets-Sheet 1
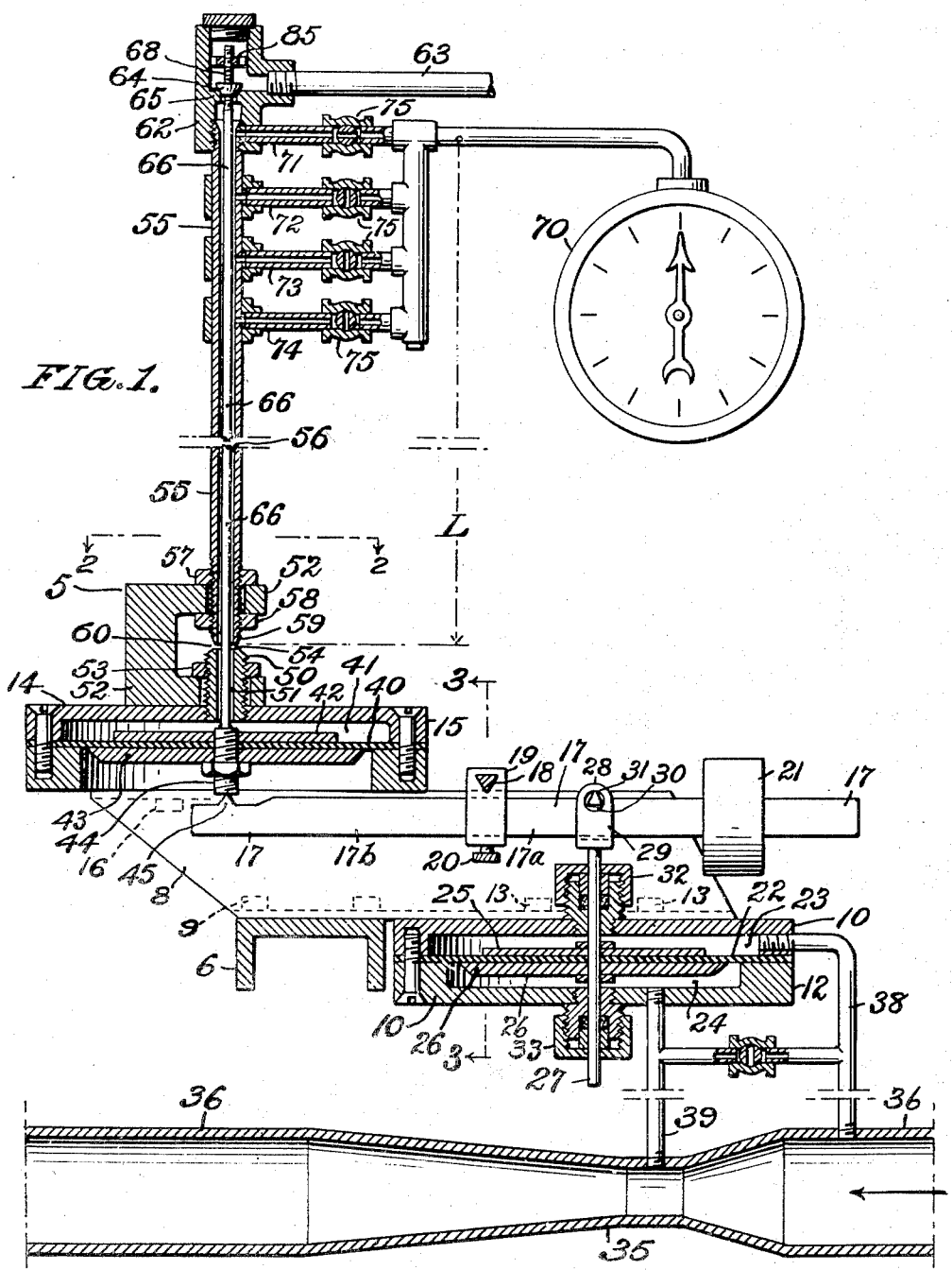
Inventor:
Emory Frank Stover
By P. DeWitt Goodwin
Attorney Jan. 17, 1950     E. F. STOVER     2,494,781
FLUID METER
Filed Sept. 29, 1944     2 Sheets-Sheet 2
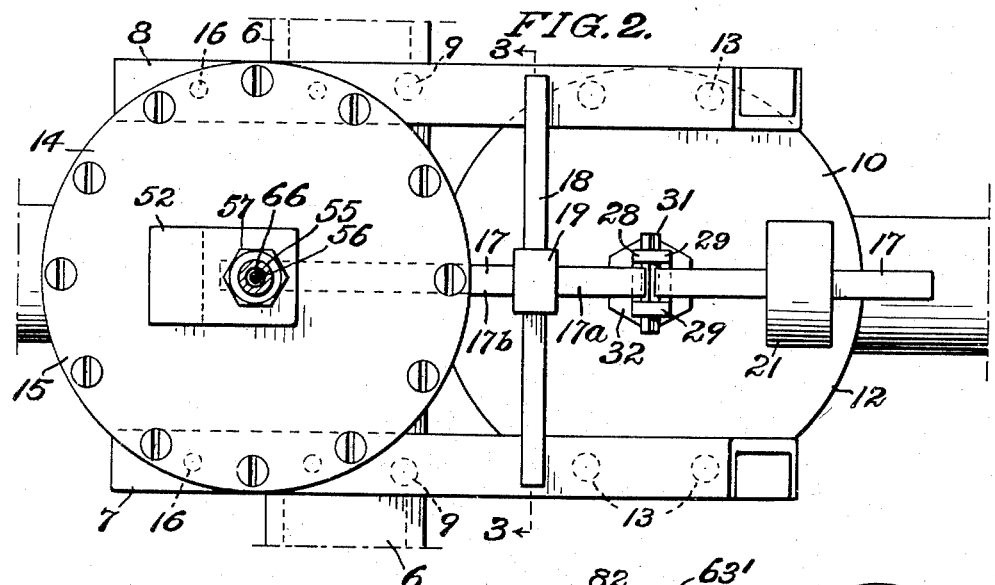
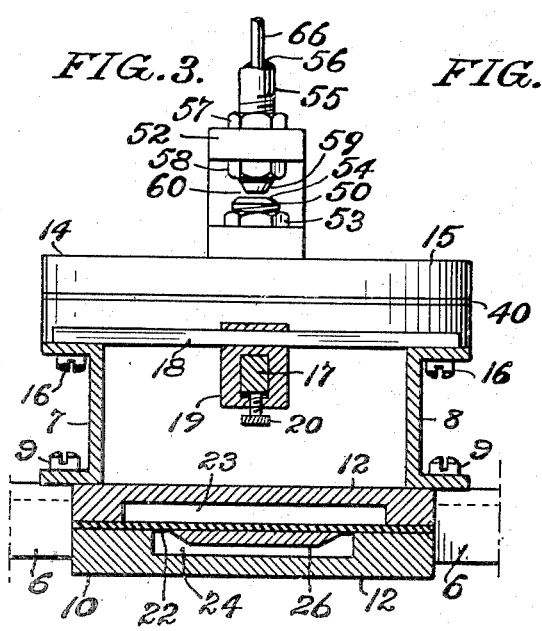
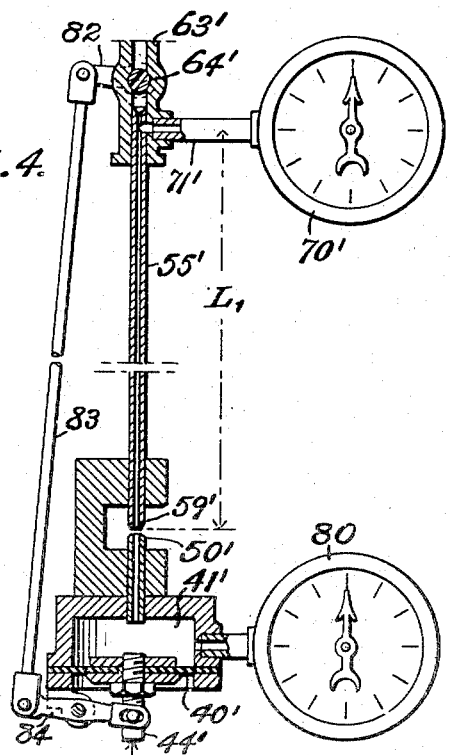
Force to be measured
Inventor:
Emory Frank Stover
By F. DeWitt Goodwin
Attorney Patented Jan. 17, 1950

2,494,781

UNITED STATES PATENT OFFICE 2,494,781

FLUID METER

Emory Frank Stover, Wynnewood, Pa.

Application September 29, 1944, Serial No. 556,378

25 Claims. (Cl. 73—205)

My invention relates to improvements in a measuring system for measuring and indicating variations in conditions and forces, where it is desired to obtain a square root relation of the force to be measured.

My invention particularly relates to flow meters used in connection with primary metering devices, such as Venturi tubes, orifices, nozzles and Pitot tubes, connected in conduits, or with Pitot tubes used for obtaining the speed of ships, aeroplanes, or the like, and adapted for obtaining a differential pressure, or force, proportional to the square of flow, or speed.

The object of my invention is to provide a novel measuring system for obtaining the square root relation of a differential pressure or force.

A further object is to provide a measuring system having a source of fluid pressure supply, preferably air, and hereinafter termed a pilot fluid, which is separate and independent of the flow of fluid through a conduit, and provide apparatus for controlling the flow of the pilot fluid for obtaining a measurement of a condition, force, or the rate of flow of fluid.

A further object is to provide means in the form of a tube for producing a laminar flow of the pilot fluid through a given length of the tube, in which the pressure drop resulting from the laminar flow through the tube is directly proportional to the velocity through the tube.

A further object is to provide indicating means, in the form of a gauge, for indicating the first power of the velocity of the pilot fluid through the laminar flow tube, and provide a plurality of connections between the tube and the gauge by which the effective length of the tube may be varied.

A further object is to employ an impact, or Pitot tube, against which the discharge from the laminar flow tube is applied for producing a static pressure within a pressure responsive device, which pressure is proportional to the square of the rate of flow through the laminar flow tube.

A further object is to provide apparatus for opposing the movement of the pressure responsive device by a force to be measured.

A further object is to provide means actuated by the movements of the responsive device for varying the supply of the pilot fluid, to the laminar flow tube, for maintaining the responsive device in balance between the static pressure and the force to be measured, whereby the gauge will indicate the square root of the force to be measured.

A further object is to provide apparatus adapted for applying the second power of an initial force to said responsive device for opposing the static pressure produced by the impact from the laminar flow tube, whereby the gauge will show a reading directly proportional to said initial force.

A further object is to provide a meter for measuring the flow of fluid through a conduit, in which meter the velocity of the pilot fluid, as shown by the reading of the gauge, will be directly proportional to the rate of flow through the conduit.

A further object is to provide apparatus including a lever, for opposing a differential pressure produced by a primary metering device connected in the conduit, by the force produced by the velocity of the pilot fluid, and provide means for adjusting the ratio of the arms of the lever for adapting the apparatus to different maximum rates of flow in the conduit.

These together with various other novel features of construction and arrangement of the parts, which will be hereinafter more fully described and claimed, constitute my invention.

Referring to the accompanying drawings:

Fig. 1 is a central vertical sectional view of a flow meter embodying my invention.

Fig. 2 is a horizontal section on line 2—2, Fig. 1.

Fig. 3 is a transverse vertical section on lines 3—3, Figs. 1 and 2.

Fig. 4 is a diagrammatic view of a measuring system illustrating the operation of the laminar flow tube and parts associated therewith.

In the drawings in which like reference characters refer to like parts, 5 represents a flow meter comprising a base 6, upon which is secured longitudinal side frame members 7 and 8, secured to said base by screws 9. A differential pressure responsive device 10, comprising a casing 12. is secured to the frame members 7 and 8 by screws 13. A second pressure responsive device 14, comprising a casing 15, is secured to said frame members by screws 16.

A lever 17 is pivoted upon the frame members 7 and 8 by means of a knife edge cross-bar 18, rigidly secured in a head 19, which in turn is adjustably secured upon the lever 17 by a thumb screw 20, which permits the head 19 to be adjusted relatively to the lever 17 and the crossbar to be adjusted longitudinally upon the members 7 and 8, for varying the position of the fulcrum relatively to the arms of the lever 17. Said lever 17 is also provided with a movable counter weight 21.

The differential pressure device 10 is provided with a flexible diaphragm 22 forming a high pressure chamber 23 and a low pressure chamber 24. The diaphragm 22 is secured between clamp plates 25 and 26 and a rod 27 is secured to said clamp plates and is movable with the diaphragm. The rod 27 has a head 28 formed with cheek plates 29 which straddle the lever 17. Said cheek plates 29 are provided with apertures 30 adapted to embrace a knife edge cross-bar 31, secured upon the lever 17. The rod 27 is slidably mounted in stuffing boxes 32 and 33 upon the casing 12, forming the responsive device 10.

A primary metering device, in the form of a Venturi tube 35, is connected in a conduit 36, for measuring the rate of flow of fluid through the conduit 36. The primary device 35 is connected by a pipe 38 with the high pressure chamber 23 and by a pipe 39 with the low pressure chamber 24, of the responsive device 10. A differential pressure is thus applied to the diaphragm 22, the action of said pressure is applied to the rod 27, and to the knife edge 31, secured upon the arm 17a of the lever 17. The differential pressure applied to the diaphragm 22 is proportional to the square of the rate of flow through the conduit 36.

The pressure responsive device 14 has a flexible diaphragm 40, forming a presure chamber 41, within the casing 15. The diaphragm 40 is secured between clamp plates 42 and 43 by means of a shaft 44. The shaft 44 extends without the chamber 41 and engages a knife edge 45, upon the arm 17b of the lever 17. The shaft 44 is provided with a screw thread adapted for adjustably securing the shaft upon the clamp plates 42 and 43 and the diaphragm 40. By this construction an adjustment may be made between the diaphragm and the lever 17.

An impact, or Pitot tube, 50 is mounted upon the casing 15 and communicates with the chamber 41 through a passage 51, formed through the tube. Said tube 50 consists of a short threaded sleeve secured in the casing 15 and adapted for clamping a bracket 52 upon the casing by means of a clamp nut 53. Said tube 50 has an inlet end 54 open to the atmosphere.

A laminar flow tube 55, having a passage 56, is secured by nuts 57 and 58 upon the bracket 52, in axial alignment with the Pitot tube 50. The discharge end 59 of the tube 55 is mounted in spaced relation with the inlet end 54 of the tube 50, and forms a gap 60 between the tubes 50 and 55. When air is projected from the tube 55 against the impact end of the tube 50 a pressure will be created within the chamber 41, as hereinafter more fully explained.

The laminar flow tube 55 is provided with a screw threaded portion which is in slidable engagement with the bracket 52, whereby the gap 60 may be varied and the tube 55 secured in an adjusted position upon the bracket 52 by the nuts 57 and 58.

The laminar flow tube 55 is connected with a valve casing 62, through which the pilot fluid, such as air, under the pressure, is supplied through a pipe 63 from a source of supply. A valve 64 is adapted to engage a valve seat 65, formed upon the casing 62, and controls the flow of air to the laminar flow tube 55.

A rod 66 is mounted for movement upon the axis of the laminar flow tube 55 and also upon the axis of the Pitot tube 50 and is adapted for operating the valve 64 when the rod is actuated by the diaphragm 40, to which said rod is secured.

Said rod 66 is also adapted for reducing the radial width of the annular passage 56, through the laminar flow tube, to the proper size for maintaining laminar flow.

The rod 66 is rigidly secured to the shaft 44, which in turn is rigidly secured to the diaphragm 40. The opposite end of the rod 66 is provided with a threaded portion 68, which provides means for adjusting the valve 64 upon said rod and relatively to the valve seat 65.

The discharge of air from the laminar flow tube 55 against the impact end 54 of the tube 50 creates a static pressure within the chamber 41, which pressure is proportional to the square of the velocity of the air impinging upon the tube 50.

When there is a flow of fluid through the conduit 36, a differential pressure in the responsive device 10 will cause the diaphragm 22 to actuate the lever 17, and the lever will move the rod 66 and hold the valve 64 open until the flow of air, or pilot fluid, through the laminar flow tube 55 increases the pressure within the chamber 41 sufficiently to balance the lever 17 between the pressures acting upon the diaphragms 22 and 40; the lever 17 will then actuate the valve 64 for supplying the required flow of the pilot fluid to maintain the lever 17 in balance between the forces acting upon the diaphragms 22 and 40.

A gauge 70 is adapted to be connected with the laminar flow tube 55, at various points throughout the length of the latter, by means of pipes 71, 72, 73 and 74, each pipe being provided with a valve 75. By closing all but one of said valves 75 the effective length of the laminar flow tube 55 may be varied to accommodate the limiting deflection of the gauge 70 to different limiting rates of flow through the primary metering device 35.

The fulcrum 18 of the lever 17 may be varied for changing the ratio of the lever arms 17a and 17b by adjusting the position of the block 19, upon the lever 17, and also upon the frame members 7 and 8. By adjusting the ratio of the lever arms the maximum deflection of the gauge 70 can be adjusted to the maximum flow through the conduit 36.

The adjustment of the tube 55, by means of the bracket 52 and the nuts 57 and 58, relatively to the impact tube 50, provides means for adapting the tube 55 to primary devices 35 having coefficients which vary with the rate of flow through the conduit 36.

The principle upon which a tube having laminar flow operates is illustrated in Fig. 4, in which a laminar flow tube 55' is provided with an inlet connection 63', through which a fluid, preferably air, is admitted. A gauge 70' is connected in communication with the tube 55', adjacent to the inlet end of the latter, by a pipe 71', and is adapted for indicating the pressure drop in the length $L_1$ between the pipe 71' and the discharge end 59' of the tube 55'.

An impact, or Pitot tube 50' is mounted with its open end adjacent to and in spaced relation with the discharge end of the tube 55'. A gauge 80 is connected in communication with the tube 50'.

If a fluid is made to flow through the laminar flow tube 55' of effective length $L_1$ and if the velocity of the flow is kept within certain limits, the flow will be of the type called laminar.

In laminar flow all fluid particles move in parallel lines along the tube without crosswise mixing, and the pressure loss, resulting from the flow, is directly proportional to the average velocity in the cross-section of the tube.

Poiseuille's formula expresses the pressure loss resulting from laminar flow as being directly proportional to the average velocity in the cross-section of the tube.

Poiseuille's formula:

$$h_1 = \frac{32HLV}{Jgd^2}$$

in which:

$h_1$ = the pressure loss.
$H$ = the absolute viscosity.
$L$ = the length of the tube.
$V$ = the average velocity.
$J$ = the mass density of the fluid.
$g$ = the acceleration of gravity.
$d$ = the diameter of the tube.

Reynold's number is the criterion for determining whether the flow through a circular tube will be laminar, or turbulent, and this number must be kept below 2000 to insure laminar flow. This may be represented in the following equation:

$$R_n = \frac{Vdj}{H}$$

in which:

$R_n$ = Reynold's number.
$V$ = the average velocity.
$d$ = the diameter of the tube.
$J$ = the mass density of the fluid.
$H$ = the absolute viscosity.

Laminar flow is essential to the operation of my invention. If the flow is not laminar the pressure loss is proportional to about the second power of the velocity and it is also a function of the roughness of the tube.

Referring to Fig. 4, if the tube 55' is constructed according to the necessary restrictions as to the value of Reynold's number, and a fluid is fed into the tube at the inlet 63' and ejected at the outlet 59', the pressure drop on the length $L_1$ will be proportional to the first power of the velocity of the fluid through the tube 55' and the pressure drop will be indicated upon the gauge 70'.

The fluid from the discharge end 59' of the laminar flow tube 55' is directed against the open end of the Pitot tube 50', with an impact which will create a static pressure within the tube 50' and the chamber 41', which is proportional to the second power of the velocity of the fluid impinging upon the open end of the Pitot tube 50' and the gauge 80 will indicate a pressure proportional to the square of the velocity in the laminar flow tube 55'. The reading on the gauge 80 is therefore always proportional to the square of the reading on the gauge 70'. At zero flow the reading of the gauges 70' and 80 will be equal.

When there is a flow of fluid through the tube 55', and if $h_1$ represents the reading of gauge 70' and $h_2$ the reading of the gauge 80, and $K_1$ represents a constant;
then:

$$h_1 = K_1 \sqrt{h_2}$$

$$h_2 = \frac{h_1^2}{K_1^2}$$

The measuring system illustrated in Fig. 4, includes a chamber 41' having a responsive wall, or diaphragm 40'. The pressure created in the Pitot tube 50' is admitted to the chamber 41' and tends to distend the diaphragm against a force to be measured.

A valve 64' is provided for controlling the supply of fluid to the laminar flow tube 55'. An arm 82, adapted for operating the valve, is connected by a rod 83, with one end of a lever 84. The opposite end of the lever is pivotally connected with a shaft 44', having one end thereof secured to the diaphragm and its opposite end adapted for the application of the force to be measured, as indicated. Any movement of the diaphragm will actuate the valve control mechanism for regulating the supply of fluid to the laminar flow tube until the diaphragm is balanced between the force to be measured and the pressure within the chamber 41'.

The laminar flow through the laminar flow tube 55' is discharged against the impact, or Pitot tube 50' and produces a static pressure within the chamber 41' which is proportional to the square of said flow. When the diaphragm is in equilibrium between the pressure within the chamber 41' and the force to be measured, the gauge 70' will indicate the square root of the force to be measured.

The gauges 70 and 70' are of standard construction, having equal increments of deflection for equal increments of pressure, and will indicate the square root of the force to be measured on a scale of uniform divisions.

The meter illustrated in Figs. 1 to 3, embodies the above described principles. In Fig. 1 the flow through the Venturi tube 35 and the conduit 36, creates a differential pressure in the responsive device 10.

If this differential pressure is termed $h_3$, and $q$ represents the rate of flow through the conduit 36, then:

$$h_3 = K_3^2 q^2$$

$h_1$ represents the pressure of the pilot fluid on the gauge 70;
$h_2$ represents the pressure in the chamber 41 upon the diaphragm 40;
$K, K_1, K_2$ and $K_3$ represent constants;

If the force from $h_2$ is balanced against the force $h_3$; then:

$$h_2 = K_2^2 h_3$$

$$K_2^2 h_3 = \frac{h_1^2}{K_1^2}$$

$$K_2^2 K_3^2 q^2 = \frac{h_1^2}{K_1^2}$$

$$K_1^2 K_2^2 K_3^2 q^2 = h_1^2$$

$$h_1 = K_1 K_2 K_3 q$$

$$h_1 = Kq$$

Therefore the reading $h_1$ on the gauge 70 is directly proportional to the rate of flow $q$ through the primary device 35 in the conduit 36.

In Fig. 1 the tube 55 and the rod 66 form an annular passage 56, through which a laminar flow can be maintained. This construction permits the use of a tube 55 of large diameter, through which a passage of uniform diameter throughout its entire length may be constructed and the rod 66 may be constructed with a uniform diameter having the proper cross-section to reduce the annular space 56 to the proper radial width to insure a laminar flow through the tube 55.

The operation of the meter shown in Figs. 1 to 3 is as follows:

The meter is for measuring the rate of flow of fluid $q$ through the conduit 36. The Venturi tube 35 produces a differential pressure $h_3$ which is applied to the diaphragm 22, which latter produces a force through the rod 27 to the lever arm 17a, which is proportional to the square of the flow $q$. A downward force from the diaphragm 40, acting through the shaft 44 upon the lever arm 17b, opposes the force acting upon the arm 17a.

If the two forces acting upon the lever 17 are not in balance, the rod 66 will operate the valve 64 and vary the flow of air, termed the pilot fluid, The flow of the pilot fluid impinges upon the open end of the Pitot tube 50 and produces a static pressure in the chamber 41 which will balance the force acting at the knife edge 45 of the lever 17. If the force acting upon the lever 17, at the knife edge 45, is not in balance with the force acting upon the knife edge 31 of the lever 17, the diaphragm 40 will move the rod 66 which in turn will move the valve 64 to or from its seat and regulate the flow of the pilot fluid for maintaining the lever 17 balanced between the two forces.

The rod 66 is provided with a disk 85 which slides freely in the bore of the valve casing 62 and is adapted for holding the rod 66 centered upon the axis of the tube 55, when the valve 64 is raised from its seat 65.

The gauge 70 will indicate the rate of flow of the pilot fluid through the laminar flow tube 55 which is required to maintain the forces acting upon the lever 17 in balance and the gauge 70, being graduated in the proper units, will give a direct indication, at any instant, of the rate of flow of the fluid through the primary metering device 35.

I claim:

1. A meter comprising a tube adapted for producing laminar flow of fluid and for producing a friction loss which is a first power function of said flow, means for controlling the delivery of fluid to said tube, means actuated by the flow of said fluid through the tube for producing a pressure proportional to the square of said flow, means for opposing said pressure by a force to be measured, and separate fluid pressure responsive means connected to said tube for measuring the friction loss through said tube.

2. A meter comprising a laminar flow tube, means for controlling the delivery of fluid to said laminar flow tube, an expansible chamber, an impact tube positioned adjacent to the discharge end of said laminar flow tube and in communication with said chamber, and means for supplying fluid under pressure through said laminar flow tube and discharging said fluid against said impact tube for producing a static pressure within said chamber which is proportional to the square of the velocity of flow through the laminar flow tube.

3. A meter comprising a laminar flow tube, separate means actuated by the discharge of said fluid through the tube for producing a fluid pressure proportional to the square of said flow, means for opposing the action of said fluid pressure by a force to be measured, fluid pressure responsive means connected to said tube for measuring the rate of flow through said tube as an indication of the square root of the force to be measured, and means for controlling the delivery of fluid to the laminar flow tube.

4. A meter comprising a source of fluid pressure supply, a tube constructed with a passage of the required cross-section for conducting a laminar flow of said fluid through a given length of said tube, means for controlling the delivery of fluid from said source to said tube, an expansible chamber, a Pitot tube in communication with said chamber having an open end positioned in spaced relation to the discharge end of the first mentioned tube for receiving an impact of said fluid for producing a static pressure within said chamber which is proportional to the square of the velocity through said given length of the first mentioned tube, and movable means responsive to the pressure drop through said given length of said first tube, said pressure drop being a first power function of said velocity.

5. A meter comprising a Pitot tube, an expansible chamber in communication with said tube, means for projecting a laminar flow of fluid against the open end of said Pitot tube for producing a static pressure within said chamber which is proportional to the square of the velocity of said laminar flow of fluid, and movable means responsive to the pressure drop through said laminar flow means for producing an effect proportional to the square root of the static pressure within the chamber.

6. A measuring system comprising a laminar flow tube, a Pitot tube positioned adjacent to the discharge end of said first mentioned tube, means for producing a flow of fluid through said first tube for producing static pressure within said Pitot tube, a structure responsive to said static pressure and adapted to be opposed by a force to be measured, and means actuated by said structure adapted for varying the rate of flow through said first tube for maintaining the forces acting upon said structure in balance.

7. A measuring system comprising a laminar flow tube, a Pitot tube positioned in spaced relation to the discharge end of said first mentioned tube, means adapted for varying the space between the discharge end of said first tube and the inlet end of said Pitot tube, means for producing a flow of fluid through said first tube for producing a static pressure within the Pitot tube, a structure responsive to said static pressure and adapted to be opposed by a force to be measured, means actuated by said structure adapted for varying the rate of flow through said first tube, and means for indicating the rate of flow through said first tube.

8. A measuring system comprising a source of fluid pressure supply, a tube adapted for conducting said fluid with laminar flow through a given length of said tube, a chamber having an inlet opening positioned adjacent to the discharge end of said tube adapted to receive an impact of said fluid to produce a static pressure within said chamber which is proportional to the square of the velocity of the flow through said tube, means actuated by said static pressure adapted for controlling the supply of fluid to said tube, and means for indicating the rate of flow of fluid through said tube.

9. A measuring system comprising a laminar flow tube, means for supplying fluid under pressure to the inlet end of said tube, a casing forming a static fluid pressure chamber, an impact tube communicating with said chamber having an open end subjected to the impact of fluid discharged from said laminar tube, a yieldable member forming a wall of said chamber responsive to said static pressure, means for applying a force to be measured to said member opposing said static pressure, and indicating means responsive to flow through said laminar tube.

10. A measuring system comprising a laminar flow tube, means for supplying fluid under pressure to the inlet end of said tube, a casing forming a static fluid pressure chamber, an impact tube communicating with said chamber and having an open end subjected to impact of fluid from said laminar tube, a yieldable member forming a wall of said chamber responsive to pressure created by said impact, means for applying a force to be measured to said member for opposing the action of said static pressure, and means actuated by the movements of said member for varying the supply of fluid to said laminar tube for maintaining the forces acting upon said member in balance.

11. A measuring system comprising a laminar flow tube of a given length for producing a pressure drop which is a first power function of said flow, separate means actuated by said laminar flow for producing a static pressure proportional to the square of the velocity of said flow, a member mounted for movement responsive to said static pressure, means for applying a force to said member which is proportional to a force to be measured and arranged for opposing the movement of said member by said static pressure, a valve for varying the fluid supply to said tube, means responsive to the movements of said member adapted for actuating the valve for maintaining said member in balance between said static pressure and said force to be measured, and fluid pressure responsive means connected to said tube for indicating the rate of flow through said given length of said tube.

12. A measuring system comprising a tube constructed for conducting a laminar flow of fluid through a given length of said tube, means actuated by said laminar flow for producing a static pressure proportional to the square of the velocity of said flow, a member mounted for movement responsive to said static pressure, means for applying a force to said member which is proportional to the square of a force to be measured and arranged for opposing the movements of said member by said static pressure, a valve for varying the fluid supply to said tube, a valve rod operatively associated with said valve and responsive to the movements of said member adapted for actuating the valve for maintaining said member in balance between the static pressure and the force to be measured, means for adjusting the effective length of said rod between the valve and said member, and means for indicating the velocity of flow through the tube.

13. A measuring system comprising a source of fluid supply, a tube connected with said supply, a rod positioned coaxially within said tube and forming a laminar flow passage through the tube for said fluid, means actuated by the flow of said fluid through the tube for producing a pressure proportional to the square of said flow, means for opposing said pressure by a force to be measured, and means for indicating the pressure drop through said tube.

14. A meter comprising a tube connected with a source of fluid supply, a rod positioned coaxially within said tube with the adjacent surfaces of the tube and the rod in close relation to each other to form a passage for insuring laminar flow of the fluid through said passage, an expansible chamber having a movable wall, a Pitot tube in communication with said chamber and positioned adjacent to the discharge end of the first mentioned tube for producing a static pressure within the chamber, and means for applying a force to be measured against said wall in opposition to said static pressure.

15. A measuring system comprising a tube connected with a source of fluid supply, a rod positioned coaxially within the tube and forming a laminar flow passage through the tube for said fluid, means actuated by the flow of fluid through the tube for producing a static pressure proportional to the square of said flow, a structure responsive to said static pressure and opposed by a force to be measured, a valve for controlling the supply of fluid to said tube, and means operatively associating the rod with the valve and with said structure for actuating the valve.

16. A measuring system comprising a tube connected with a source of fluid supply, a valve located between the inlet end of said tube and said supply, a rod adapted for operating the valve for varying the supply of fluid to said tube, said rod positioned coaxially within said tube and forming a laminar flow passage through said tube for the fluid, a Pitot tube positioned in axial alignment with the first mentioned tube for producing a static pressure within the Pitot tube by the discharge of fluid from said first tube, a structure responsive to said static pressure and adapted to be opposed by a force to be measured, said rod extending axially within the Pitot tube, and means mounting the rod for movement with said structure for actuating the valve.

17. A meter comprising a tube adapted for producing a laminar flow of fluid and for producing a pressure drop which is a first power function of said flow, means for controlling the delivery of fluid to said tube, means actuated by the discharge of said fluid from the tube for producing a pressure proportional to the square of said flow, means for opposing the action of said pressure by a force proportional to the square of a quantity to be measured, fluid pressure responsive and measuring means connected to said tube and responsive to the rate of flow through said tube for directly measuring said quantity.

18. A measuring system comprising a pressure device, a member mounted for movement within said device by pressures whose difference is a measure substantially proportional to the square of the rate of flow of fluid, a second pressure device, a member mounted for movement within said second device, a laminar flow tube for conducting a pilot fluid, an impact tube communicating with said second device, means mounting the impact tube for receiving the impact from the discharge of said laminar flow tube for producing a static pressure upon the member of said second device proportional to the square of the flow of the pilot fluid, means interposed between said members for opposing the movements of said members, a valve adapted for controlling the supply of the pilot fluid to the laminar flow tube, means for actuating said valve to restore said last means to balanced condition, and movable means responsive to the pressure drop through the laminar flow tube.

19. A measuring system comprising a pressure device, a member mounted for movement within said device by pressure whose difference is a measure substantially proportional to the square of the rate of flow of fluid, a second pressure device, a member mounted for movement within said second device, a laminar flow tube for conducting a pilot fluid, an impact tube communicating with said second device, means mounting the impact tube for receiving the impact from the discharge of said laminar flow tube for producing a static pressure upon the member of said second device proportional to the square of the rate of flow of said pilot fluid, a lever having opposed arms subjected respectively to the forces on said members, a valve adapted for controlling the supply of the pilot fluid to the laminar flow tube, means actuated by the unbalancing of the moments on said lever of the forces acting upon said members for actuating the valve to restore said moments to balance, and means for indicating the pressure drop through the laminar flow tube.

20. A measuring system comprising a pressure device, a member mounted for movement within said device by pressures whose difference is a measure proportional to the square of the rate of flow of fluid, a second pressure device, a member mounted for movement within said second device, a tube for providing a laminar flow of a pilot fluid, an impact tube communicating with said second device, means mounting the impact tube for receiving the impact from the discharge of the laminar flow tube for producing a static pressure upon the member of said second device proportional to the square of the rate of flow of the pilot fluid, a lever having opposed arms subjected respectively to the forces on said members, a bearing upon which said lever is fulcrumed, means for adjusting said bearing for varying the relative lengths of said arms, a valve adapted for controlling the supply of the pilot fluid to the laminar flow tube, and means actuated by the unbalancing of the moments on said lever of the forces acting upon said members for actuating the valve to restore said moments to balance.

21. A measuring system comprising a primary metering device, a differential pressure responsive device subjected to pressures whose difference is a measure substantially proportional to the square of the relative velocity of a fluid with respect to said primary device, a laminar flow tube for a pilot fluid for producing a friction loss which is a first power function of the velocity of said flow, a second pressure responsive device actuated by a pressure proportional to the square of the flow of the pilot fluid, means opposing the responsive action of said responsive devices against each other, means actuated by the unbalancing of the opposing means for varying the delivery of the pilot fluid to said laminar flow tube for restoring said responsive means to balanced condition, and fluid pressure responsive means connected to said tube for indicating the rate of flow of the pilot fluid for obtaining a direct measure of said relative velocity acting upon said primary device.

22. A measuring system comprising a primary metering device, a differential pressure responsive device subjected to pressures whose difference is a measure substantially proportional to the square of the relative velocity of a fluid with respect to said primary device, a laminar flow tube, a separate source of a fluid supply connected with said tube, a second pressure responsive device, means actuated by said laminar flow through said tube for producing a static pressure upon said second responsive device proportional to the square of the rate of flow of the fluid through said tube, means interposed between said devices adapted for opposing the forces within said responsive devices, means responsive to the unbalancing of the forces acting upon said responsive devices adapted for controlling the flow of fluid through said tube to restore balance, a gauge adapted for indicating the rate of flow through a given length of said tube which flow is directly proportional to said relative velocity, a plurality of valved connections arranged in spaced relation throughout the length of said tube and communicating with the gauge and adapted for varying said given length of the tube to accommodate the limiting deflection of the gauge to different values of said relative velocity.

23. A meter for measuring the flow of fluid through a conduit comprising a differential pressure responsive device actuated by pressure produced by flow through the conduit, a laminar flow tube adapted for flow of a pilot fluid through a given length of said tube, a second pressure responsive device actuated by pressure produced by the flow of the pilot fluid through said tube, means for opposing the responsive action of said devices against each other, means actuated by the unbalancing of the opposing means for varying the delivery of the pilot fluid to said laminar flow tube for restoring said responsive devices to balanced condition, and means for indicating the pressure drop of the pilot fluid through said tube for obtaining a direct measure of the flow through the conduit.

24. A meter having a conduit, a primary metering device in said conduit, a structure responsive to differential pressure produced by said primary device proportional to the square of the rate of flow of fluid through the conduit, a tube adapted for producing a laminar flow of a pilot fluid, means actuated by the discharge of said laminar flow through said tube for producing a static pressure proportional to the square of said laminar flow, means for opposing the action of said differential pressure by the action of said static pressure, means actuated by the unbalancing of the actions of said pressures adapted for varying said laminar flow through said tube, and indicating means responsive to the rate of said laminar flow through said tube for directly indicating the rate of flow through the conduit.

25. A measuring system for measuring the flow of fluid through a conduit comprising a primary metering device in said conduit, a pressure responsive device actuated by said primary device, a second pressure responsive device, means for opposing the responsive action of said responsive devices against each other, a Pitot tube communicating with said second device, a flexible diaphragm forming a wall of said second device, a laminar flow tube positioned in axial alignment with the Pitot tube, means mounting said laminar tube in spaced relation to said Pitot tube for producing a static pressure within said second device, a valve adapted for controlling the supply of a pilot fluid to said laminar tube, a rod attached to said diaphragm and extending through said Pitot and laminar tubes, means mounting the valve upon said rod for movement with the diaphragm, and a gauge responsive to the pressure drop of the pilot fluid through said laminar tube adapted for directly indicating the rate of flow through the conduit.

EMORY FRANK STOVER.

REFERENCES CITED

The following references are of record in the file of this patent:

UNITED STATES PATENTS

| Number | Name | Date |
|---|---|---|
| 852,581 | Sanborn | May 7, 1907 |
| 1,146,202 | Ogilvie | July 13, 1915 |
| 1,288,363 | Young | Dec. 17, 1918 |
| 1,905,401 | Moller | Apr. 25, 1933 |
| 1,972,054 | Moller | Aug. 28, 1934 |
| 2,223,712 | Ziebolz | Dec. 3, 1940 |
| 2,257,577 | Rosenberger | Sept. 30, 1941 |
| 2,297,408 | Hardebeck | Sept. 29, 1942 |
| 2,344,943 | Gooden | Mar. 28, 1944 |